United States Patent
Way et al.

(10) Patent No.: US 9,742,520 B1
(45) Date of Patent: Aug. 22, 2017

(54) OPTICAL SWITCHING SYSTEM WITH A COLORLESS, DIRECTIONLESS, AND CONTENTIONLESS ROADM CONNECTED TO UNAMPLIFIED DROP CHANNELS

(71) Applicant: NeoPhotonics Corporation, San Jose, CA (US)

(72) Inventors: Winston Way, Irvine, CA (US); Ilya Vorobeichik, Los Gatos, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 14/858,086

(22) Filed: Sep. 18, 2015

Related U.S. Application Data (60) Provisional application No. 62/052,528, filed on Sep. 19, 2014.

(51) Int. Cl.
  *H04J 14/02* (2006.01)
  *H04Q 11/00* (2006.01)
  *H04L 1/00* (2006.01)

(52) U.S. Cl.
  CPC ...... *H04J 14/0221* (2013.01); *H04J 14/0204* (2013.01); *H04J 14/0212* (2013.01); *H04L 1/0047* (2013.01); *H04Q 11/0005* (2013.01); *H04Q 2011/0016* (2013.01); *H04Q 2011/0047* (2013.01); *H04Q 2011/0084* (2013.01)

(58) Field of Classification Search
  CPC .. H04J 14/0212; H04Q 11/0005; H04B 10/27
  See application file for complete search history.

(56) References Cited

U.S. PATENT DOCUMENTS

| | | |
|---|---|---|
| 5,581,643 A | 12/1996 | Wu |
| 6,144,781 A | 11/2000 | Goldstein et al. |
| 6,615,615 B2 | 9/2003 | Zhong et al. |
| 6,658,179 B2 | 12/2003 | Kubby et al. |
| 6,674,935 B2 | 1/2004 | Kelly et al. |
| 6,711,313 B2 | 3/2004 | Takigushi et al. |
| 6,868,201 B1 | 3/2005 | Johnson et al. |
| 6,882,800 B1 | 4/2005 | Graves |

(Continued)

OTHER PUBLICATIONS

Appelman et al., "All-Optical Switches—The Evolution of Optical Functionality," in LightwaveOnline, (Nov. 1, 2001), vol. 18, Iss. 13, (9 pages). Retrieved May 3, 2013 from http://www.civcom.com/admin/articles/spic/evolution.pdf.

(Continued)

*Primary Examiner* — Dzung Tran
(74) *Attorney, Agent, or Firm* — Christensen, Fonder, Dardi & Herbert PLLC; Peter S. Dardi (57) ABSTRACT

Components of an optical communications network are described at a node of the network providing switching from one or more degrees of received optical signal routed to a plurality of receivers. The switch at the node generally includes a passive reconfigurable optical add drop multiplexer (ROADM) having drop or output ports that connector to optical channels leading to optical receivers without optical amplifiers between the ROADM outputs and the receivers. Configurations of the node and corresponding parameters are described that provide for use of lower cost components due to the absence of an array of optical amplifiers connected to the ROADM outputs.

14 Claims, 7 Drawing Sheets

(56) References Cited

U.S. PATENT DOCUMENTS

| | | | |
|---|---|---|---|
| 6,990,265 | B2 | 1/2006 | Kubby et al. |
| 6,999,652 | B2 | 2/2006 | Mino et al. |
| 7,085,445 | B2 | 8/2006 | Koh et al. |
| 7,160,746 | B2 | 1/2007 | Zhong et al. |
| 7,206,473 | B2 | 4/2007 | Mino et al. |
| 7,447,397 | B1 | 11/2008 | Maki et al. |
| 7,590,312 | B2 | 9/2009 | Mizuno et al. |
| 7,805,037 | B1 | 9/2010 | Van Der Vliet et al. |
| 8,891,914 | B2 | 11/2014 | Ticknor et al. |
| 2002/0030867 | A1 | 3/2002 | Iannone et al. |
| 2002/0163693 | A1 | 11/2002 | Rubissa et al. |
| 2002/0191899 | A1 | 12/2002 | Kelly et al. |
| 2003/0210870 | A1 | 11/2003 | Graves |
| 2006/0165070 | A1 | 7/2006 | Hall et al. |
| 2006/0263088 | A1 | 11/2006 | Handelman |
| 2007/0154137 | A1 | 7/2007 | Mino et al. |
| 2008/0226290 | A1 | 9/2008 | Ohyama et al. |
| 2009/0067845 | A1 | 3/2009 | Zhong et al. |
| 2010/0129082 | A1* | 5/2010 | Zhong ............... H04J 14/0204 398/83 |
| 2010/0272441 | A1* | 10/2010 | Boduch ............... H04J 14/0206 398/83 |
| 2011/0164876 | A1 | 7/2011 | Fujita et al. |
| 2011/0200335 | A1 | 8/2011 | Koka et al. |
| 2013/0195449 | A1 | 8/2013 | Ghioni et al. |
| 2014/0133849 | A1* | 5/2014 | Ishii ............... H04B 10/07953 398/26 |
| 2015/0055952 | A1* | 2/2015 | Younce ............... H04J 14/0212 398/48 |
| 2015/0155934 | A1* | 6/2015 | Nakagawa ......... H04B 10/0775 398/34 |
| 2015/0188276 | A1* | 7/2015 | Mitchell ............. H04J 14/0201 359/337.21 |

OTHER PUBLICATIONS

Carena et al., "Modeling of the Impact of Nonlinear Propagation Effects in Uncompensated Optical Coherent Transmission Links," J. Lightwave Technol., (2012), 30(10):524-1539.

De Oliviera et al., "Hybrid EDFA/Raman Amplification Topology for Repeaterless 4.48 Tb/s (40 112 Gb/s DP-DQPSK) Transmission Over 302 Km of G.652 Standard Single Mode Fiber," J. Lightwave Technol., (2013), 31(16):2799-2808.

Goh et al., "High Extinction Ratio and Low Loss Silica-Based 8×8 Strictly Nonblocking Thermooptical Matrix Switch," J. of Lightwave Technology, 17(7): 1192-1199, Jul. 1999.

Goh et al., "Low Loss and High Extinction Ratio Strictly Non-Blocking 16×16 Thermooptical Matrix Switch on a 6-in Wafer Using Silica-Based Planar Lightwave Circuit Technology," J. of Lightwave Technology, 19(3): 371-379, Mar. 2001.

Prasanna et al., "Versatility of a Colorless and Directionless WSS Based ROADM Architecture," COMSNET 2009 Conference, Jan. 2009, Bangalore, India.

Watanabe et al., "Compact PLC-based Transponder Aggregator for Colorless and Directionless ROADM," OFC/NFOEC 2011, paper OTuD3 (abstract only), Mar. 2011.

Way et al., "Optimum Architecture for M×N Multicast Switch-Based Colorless, Directionless, Contentionless, and Flexible-Grid ROADM," Optical Fiber Communications Conference and Exhibition, (2012), 3 pages.

Xia et al., "21.7 Tb/s Field Trial with 22 DP-8QAM/QPSK Optical Superchannels Over 1,503-km of Installed SSMF," Optical Fiber Communications Conference and Exhibition, (2012), PDP5D.6, (3 pages).

Younce et al., "Engineering Colorless/Directionless/Contentionless Metro/Regional Networks for 400G+," Optical Fiber Communications Conference and Exhibition, (2013), OTh4B.5, (3 pages).

Gringeri et al., "Flexible architectures for optical transport nodes and networks," IEEE Communications Mag., 48(7):40-50, Jul. 2010. (Abstract only).

Nelson et al., "Detection of a Single 40 Gb/s Polarization-Multiplexed QPSK Channel With a Real-Time Intradyne Receiver in the Presence of Multiple Coincident WDM Channels," J. Lightwave Technol., 28(20):2933-2943, Oct. 2010. (Abstract only).

\* cited by examiner

OPTICAL SWITCHING SYSTEM WITH A COLORLESS, DIRECTIONLESS, AND CONTENTIONLESS ROADM CONNECTED TO UNAMPLIFIED DROP CHANNELS

CROSS REFERENCE TO RELATED APPLICATIONS

This application claims priority to U.S. provisional patent application 62/052,528 to Way et al., entitled "Colorless, Directionless, and Contentionless ROADM Without Drop-Side EDFAs," incorporated herein by reference.

FIELD OF THE INVENTION

The invention relates to an optical switching system that incorporates a colorless, directionless, and contentionless reconfigurable optical add drop multiplexer (CDC-ROADM) in which the drop channels are unamplified. The switching system can be effectively used, for example, in switching high signal-to-noise optical signals such as in a metro area optical node.

BACKGROUND OF THE INVENTION

Modern optical communications networks are universally used to interconnect distant, regional, and metropolitan communications hubs for directing numerous diverse streams of telephony, digital video, internet, and other types of digital data. The means for most efficiently and economically managing the ever-increasing capacity and speed demands on these networks, many communications channels are aggregated into streams each carrying up to 10 gigabits per second, presently emerging 40 and 100 gigabits per second, and future prospects for multiple hundreds of gigabits per second per aggregated data stream. Dozens of these data streams are transmitted simultaneously through each fiber in the network utilizing wavelength-division multiplexing (WDM) where each stream is carried by an optical signal having an optical wavelength slightly different but fully distinguishable from all the other wavelengths for the other streams in the fiber. These optical streams are routinely combined and separated as appropriate by various well-known optical filter components at each end of the optical fiber link.

These optical networks include many locations where optical fibers intersect at 'nodes'. These nodes are in many ways analogous to the intersections of a complex highway system. Much traffic comes to the node along each of the fibers, but not all the traffic on any fiber is necessarily bound for the same destination. Some of the traffic may be bound for destinations local to the node, there may be new traffic originating local to the node, and other traffic may need to be independently rerouted among the various outbound fibers from the node. Effecting the necessary reconfiguration of traffic at these nodes is provided by switches.

Until recently, the primary means to provide such switching would be electronic. To accomplish this, every wavelength in each fiber would be separated to individual physical channels, and then the data in each of those wavelengths would be converted by an optical receiver into binary electrical data. Once all the data is in electrical form it can be piped into an electronic switching matrix in any of numerous possible configurations, and reorganized into appropriate groupings on multiple output channels. Then the data in each output channel is converted back to optical by an optical transmitter at each output having a specific predetermined wavelength and the data streams on distinct wavelengths bound for each output fiber are remultiplexed and inserted into that fiber. There may also be input and output data streams associated with local traffic that can be integrated with the data passing through the node using additional ports on the switching matrix. At the data rates used in each wavelength, electro-optic receivers and transmitters are relatively expensive, bulky, and power hungry as compared to purely optical dispatch. Also, within an electrical switch matrix, electrical power is required to push each and every bit of data through the matrix, and there may be hundreds of billions or trillions of bits moving through the matrix every second. In principle, electronic switching can provide the ultimate flexibility in reconfiguring, formatting, synchronizing, and otherwise optimizing the presentation of the data before sending it on its way. However, for the amount of data passing through a modern node, it is far and away simply impractical to switch everything electronically, and the economics of providing the fundamental hardware is also unsupportable. Furthermore, the bandwidth passing through the nodes is only expected to increase with time.

Optical switching technology has been emerging to complement the electronic switching in concurrence with, and in fact enabling the increase in bandwidth of the data passing through the nodes. Optical switching generally treats each wavelength as a cohesive unit and passes each wavelength transparently to its destination within the node, either an output fiber or a wavelength channel associated with local traffic. The transparent optical switch effectively establishes a physical path for the light at the specified wavelength on the specified input fiber to be passed linearly and directly to the desired output fiber or local port. Such a switch essentially passes any optical data regardless of format or content as long as it is within the optical wavelength range specified for that optical channel. Since the optical switch cannot modify the detailed data within the optical wavelength, it is not as flexible as an electronic switch. But more significantly, the power required to switch the data for that wavelength is merely the amount of power needed to establish and maintain the optical path through the switch, which is generally orders of magnitude less than required for electronically switching the same data. As power consumption is often the limiting factor for the bandwidth that can be managed by a node, optical switching is not merely a convenience of remote configuration, but clearly enables the current and future performance levels of optical networks.

SUMMARY OF THE INVENTION

In a first aspect, the invention pertains to a method of routing optical signals for a lower optical noise network, the method comprising the step of routing a combined input optical signal with no more than N signals for routing through an unamplified reconfigurable optical add-drop multiplexer (ROADM), in which the input optical signal has an optical signal-to-noise value of at least about 16.5 dB, to 1 to M optical receivers configured on separate optical pathways and having a raw bit error rate of no more than about $1 \times 10^{-2}$. In some embodiments, the ROADM comprises N 1×N WSS and a N×M multicast switch, which can be a single module or a set of connected expandable modules.

In a further aspect, the invention pertains to an optical telecommunications switching structure comprising reconfigurable optical add-drop multiplexer (ROADM) comprising N input ports, N 1×N WSS with one WSS connected to each of the N input ports, N' (N' being 1 to N) number of N×M MCS where each input port of each MCS is connected to one output port of a distinct WSS, and N'×M and M output port receiving a combined unamplified signal from the corresponding M output ports of the N' MCS.

In another aspect, the invention pertains to a method of selecting an optical coherent receiver for receiving an optical signal from an unamplified drop port of a ROADM switch, the method comprising the step of identifying an optical coherent receiver that would provide a bit error rate (BER) less than a cut off value based on an algorithm to extract data from the optical signal with appropriate forward error correction technique when the optical coherent receiver is optically connected to a light channel connected to the unamplified drop port of the ROADM.

DETAILED DESCRIPTION OF THE INVENTION

With a relatively high optical signal-to-noise input signal, it has been discovered that optical communication switching can be performed at a node interfaced with an array of optical receivers with a reconfigurable optical add-drop multiplexer (ROADM) with drop channels that are not amplified while providing a suitable signal for selected optical receivers. ROADMs as described herein can be colorless, directionless and contentionless (CDC) as described further below. An optical amplifier, generally an erbium-doped fiber amplifier (EDFA), can be an expensive part of a standard ROADM-based optical switch, where the EDFAs can be in some cases a majority of the cost of the switch. The ROADM generally can comprise an N×M multicast switch (MCS) To achieve a higher degree of optical switching efficiently, expandable switches in a planar lightwave circuit (PLC), including expandable MCS, have been developed that can provide for a higher degree of optical switching allowing for expanding optical networking systems. Thus, with or without an expandable switch, CDC ROADM in a PLC format can be effectively used for appropriate optical nodes, such as metro optical nodes, that have a relatively small number of add/drop ports, such as 4-16 or more. Optical nodes with appropriately high signal-to-noise can be configured with CDC ROADM and suitable optical receivers in a system configuration that avoids drop side amplifiers for a significant decrease in cost for the ROADM. The system described herein can provide cost effective metro switching for user access to the network with significant decrease in power consumption.

Colorless, directionless, and contentionless (CDC) reconfigurable optical add-drop multiplexers (ROADMs) are a significant component of software-defined optical networks with dynamic wavelength add, drop, and routing. However, CDC ROADMs that employ N×M multicast switches (MCSs), where N is the number of degrees and M is the number of add ports or drop ports, can suffer from a relatively high optical insertion loss of the broadcast-and-select-based MCSs. Thus, an array of N erbium-doped fiber amplifiers (EDFA) in both the add directions and drop directions can be used to compensate for the MCS loss. Thus, for example, with an 8×16 MCS, 8 drop EDFA and 8 add EDFA can be used, which increases cost, size and power consumption of the CDC-ROADM, which can limit large scale deployment of the systems.

Optical nodes supporting a modest number of directions or degrees, e.g., no more than 16 directions, as well as a modest number of add/drop ports, e.g., no more than 16, are suitable for use with compact MCSs that are PLC based. Optical nodes serving a small number of users, such as 4 to 16 can make use of such compact MCS, such as 4×4 to 4×16 MCS for 4 directions/degrees. Through the use of expandable MCS, these can be expanded to 16×4 to 16×16 MCS through an array of interconnected MCS, and other dimensions of MCS with expansion with respect to input and/or output degrees being possible. Expandable PLC based MCS architectures are described further below.

As with all communication networks, optical networks integrate switching functions to provide for various connections to provide for routing of transmissions. For example, longer range transmission pathways are connected with branches to direct optical signals between ultimate pathways associated with the sender and recipient. Separation of particular communications or portions thereof can be based on wavelength and/or temporal differentiation within a combined transmission sent over longer range trunk, i.e., combined signal lines. At some location on a network, an optical band can be split to isolate specific signals within the band for routing, and similarly individual communications are combined for transmission over combined signal lines. The optical switching function can be performed using electronic switching by first converting the optical signal into an electronic signal with appropriate receiver(s). However, cost ultimately can be significantly reduced, and/or switching capacity significantly increased, if an efficient optical switching can be performed with reduced conversion of optical signals into electronic signals.

If the optical switching cannot be appropriately scaled, optical switching can only be used in limited network architectures. Optical and electronic switching complement each other in applications for optical networks. Though improvements are still coming, the basic character of electronic switching is well established. The technology for optical switching however is still emerging and various innovations are still needed for optical switching devices to begin to fully address their expected domain. Present and forthcoming optical switching systems generally fall into a few basic architecture classes. Switches for the current applications can be referred to as reconfigurable optical add-drop multiplexer (ROADM). For the formation of colorless, directionless and contentionless ROADM, an embodiment is described in more detail below with an array of wavelength-selective switch (WSS) connected to each input direction and the output of the WSS switches are directed to n array of multicast switches (MCS) that can route the split signals from the WSS to a selected drop or output port.

It is an unfortunate circumstance of optical networking arts that there are two very different items that bear the designation 'ROADM'. A legacy ROADM provides the capability to independently determine for each wavelength in an input fiber whether that wavelength will be routed to the corresponding output fiber or dropped to a local port or different fiber pair. Additionally in a legacy ROADM, any wavelength that is dropped and thus not directly routed to the output can be used to introduce new optical data streams from the local ports or other fiber pair into the output fiber. A legacy ROADM can also be referred to as a ROADM component, but there are also higher-degree ROADM systems that can be used to selectively drop or route through individual wavelengths among a larger number of input/output fiber pairs. Originally ROADM systems were simply collections of ROADM components and the control systems that tied them together and the common name presented no problem. These higher-order ROADMs have, however, evolved and often comprise some of the other classes of optical switches including, for example, WSS, optical cross connect switches (OXC) and MCS. Legacy ROADM components still exist, but the ROADM term more commonly now refers to the higher-order system. Subsequently the term ROADM, unless specifically citing 'ROADM component', shall refer to the higher-level ROADM system.

A M×N multicast switch uses M1×N splitters at the M input channels to distribute all the optical signals in each input port towards each of the N outputs. Each of the N outputs has its own M×1 selector switch to isolate the signals from the desired input port. The MCS has the basic advantage of having no optical filtering, so it is not only transparent to the data in each wavelength, it is transparent to the wavelength set configuration itself ("colorless"), i.e. wavelength channels do not need to conform to any specific wavelength grid specifications or channel bandwidths. The primary cost of this added transparency is the reduction of signal power due to the optical splitting on the input stages, and the MCS in some applications involves an array of optical amplifiers to boost the signal level and compensate the additional loss for each input. Expandable PLC MCS are described below.

Figure 1:
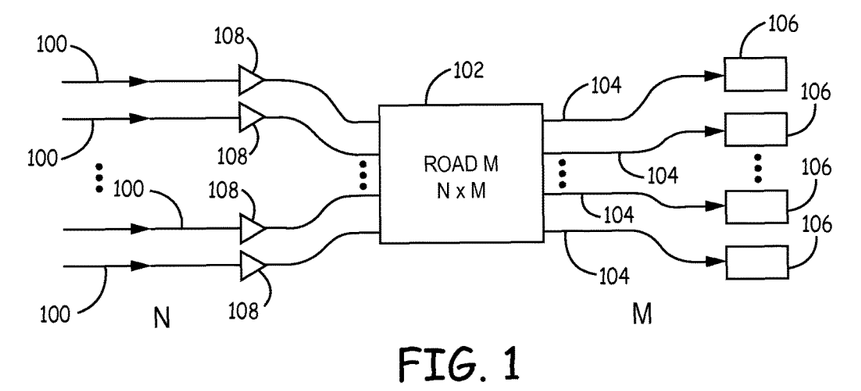
FIG. 1 is a schematic diagram of an optical communication network node in which a set of N input optical channels are directed through a ROADM switch to deliver optical signals to M optical receivers.

Referring to FIG. 1, an optical node is shown, which can be a termination point in an optical network connecting to a set of M users. As shown, N optical input lines 100 can be provided by optical fibers, which may also comprise planar optical components. The optical switch comprises an N×M ROADM 102. ROADM 102 can be connected to M output lines 104, which can comprise optical fibers and/or planar optical components for directing the multiplexed optical signals to an array of optical receivers 106. Each input 100 can pass through an optional optical amplifier 108, such as an EDFA, prior to input into the ROADM. Optical receivers 106 can convert the optical signals into electrical signals. In an actual optical node, ports of the ROADM can be unused on either the input or output sides, which can supply later expansion capacity. Thus, if there is unused capacity of the node, the diagram would be correspondingly revised with untapped ports. In the various embodiments described more specifically herein, N and M generally run from 4 to 16, but generally, these values can take larger values and as technology improves, there is generally commercial need for greater network sizes which then to suggest growing numbers of degrees with respect to inputs as well as output, which may correspond in some embodiments with individual users.

Figure 2:
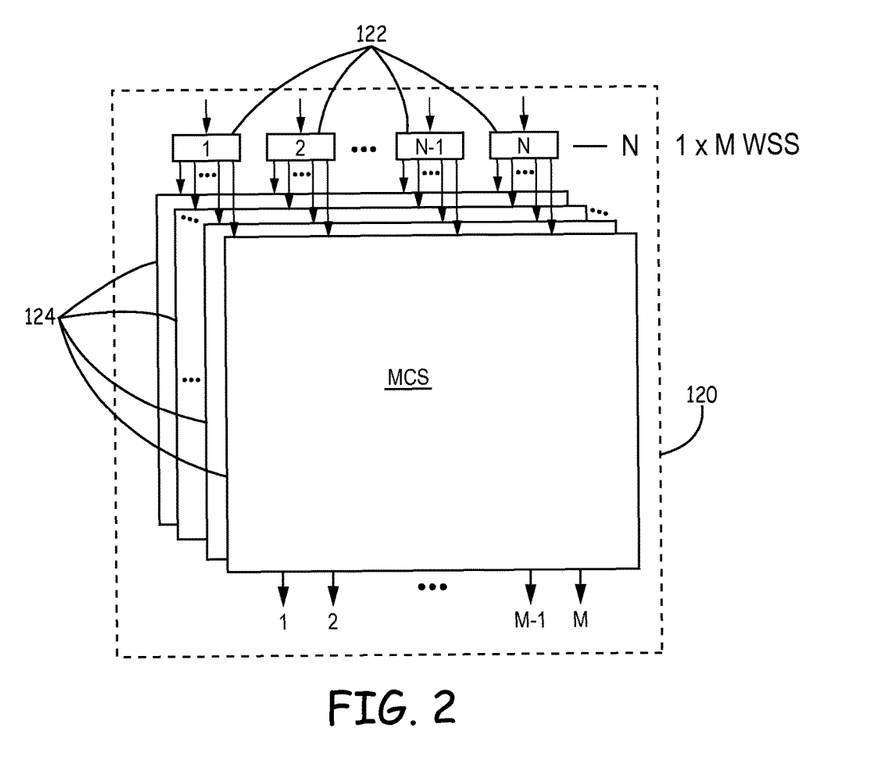
FIG. 2 is a schematic view of a ROADM structure based on an array of N 1×M wavelength selective switches (WSS) connected to M multicast switches (MCS).

Referring to FIG. 2, an embodiment of a CDC ROADM 120 is shown in which signals from N directions are directed to an array of N WSS 122 with each being a 1×M' switch, M'≥M. If M'>M, the additional M'−M channels can be used for additional contention mitigation, if desired. Contention mitigation in such ROADM designs is described further in U.S. Pat. No. 8,891,914 B2 to Ticknor et al. (hereinafter the '914 patent), entitled "Scalable Optical Switches and Switching Modules," incorporated herein by reference. M outputs of the WSS are directed to M (N×M) MCS 124, with one output from each WSS 122 going to each of the MCS 124. Thus, each MCS 124 received N input signals. The M outputs of the M MCS are optically combined to form the M outputs ROADM.

Current WSS class switches have a single input and several outputs and each wavelength on the input can be independently routed to any of the outputs and each output can accommodate any number of the wavelengths on the input fiber. The WSS, like most classes of transparent optical switches, provides a connection between the input and output equally well for optical signals propagating from the input to an output, or propagating from the same output to the input. Therefore, the terms 'input' and 'output' are used merely as a convenience to describe the operation principle, but in practice they may be used as described or may be used in the reverse direction.

Figure 3:
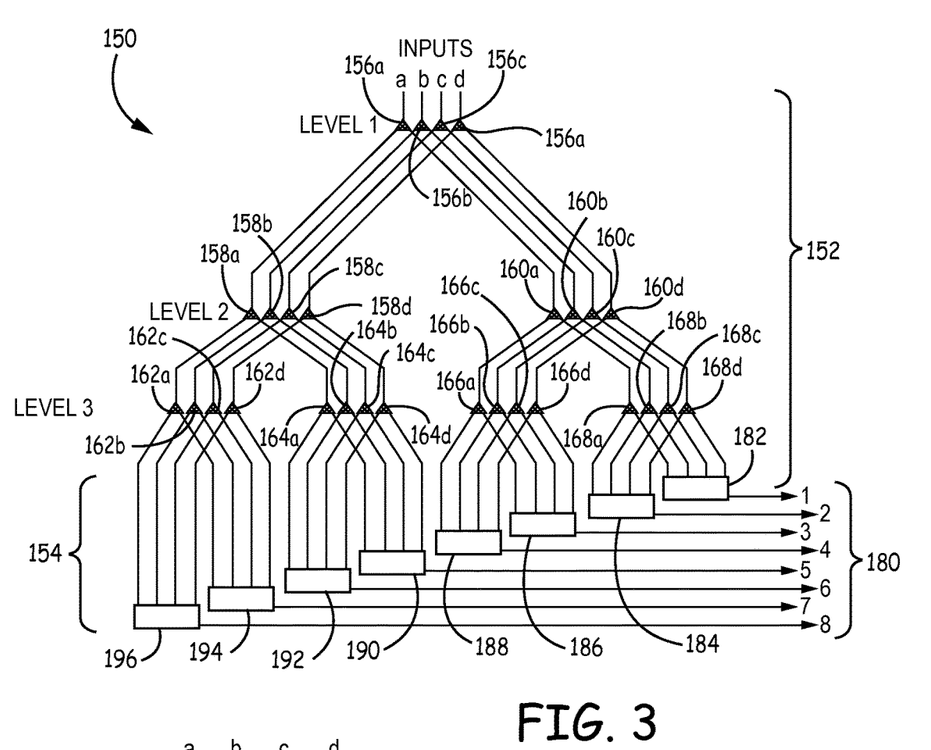
FIG. 3 is a schematic view of the switching within a 4×8 MCS switch.

FIG. 3 depicts an embodiment of a 4×8 multicast switch. Components of the switch are arranged to illustrate their interconnections and how paths, switches, and splitters can be made to cooperate to provide expandability in a multicast application. Artisans reviewing this illustration will be able to make physical device layouts based on this schematic layout. An 8×8 PLC cross connect switch is described in Goh et al., "Low Loss and High Extinction Ratio Strictly Nonblocking 16×16 Thermooptic Matrix Switch on 6-in Wafer Using Silica-Based Planar Lightwave Circuit Technology," Journal of Lightwave Technology 19(3):371-379 (March 2001). The rough layout of a PLC as described herein that approximately follows a layout set forth in the Goh article is shown in the '914 patent cited above. In applying the present invention to this type of physical layout, the expansion waveguides and bypass switches of the present invention can be routed adjacent to the existing waveguides and switches, retaining the existing staging, thereby imposing little or no increase to the required size of the integrated chip.

Referring to the conceptual layout in FIG. 3, expandable multicast switch 150 has splitter tree 152 and switching section 154. Splitter tree 152 multiplies optical inputs a, b, c, d so that each one is connected to each optical output line 1-8. Input ports can be provided to provide optical connections from the device interface to inputs a-d. As shown in FIG. 3, splitter tree 152 has three levels to appropriately split the signal into appropriate number of optical paths, although a different number of levels can be used depending on the number of input lines and desired multicasting into particular output optical lines, and a person of ordinary skill in the art can generalize this schematic layout for different numbers of input and output lines. Level 1 has an optical splitter on each input, with splitters 156a, 156b, 156c, 156d splitting input lines a, b, c, d, respectively to thereby make 2 branches for each input, for a total of 8 branches. The split signals are passed to level 2 splitters 158a, 158b, 158c, 158d, 160a, 160b, 160c, 160d that split the signals into 2 branches for each input to that level, for a total of 16 branches and a total of 4 signals for each of inputs a-d. The split signals are then passed to level 3 splitters 162a, 162b, 162c, 162d, 164a, 164b, 164c, 164d, 166a, 166b, 166c, 166d, 168a, 168b, 168c, 168d, that each split the signals into 2 branches thereby making 32 branches and a total of 8 signals for each of inputs a-d.

Switching section 154 connects splitter tree 152 with output lines 180 labeled 1-8 each optically connected to an output port (schematically shown as the end of the output lines). Switching blocks 182, 184, 186, 188, 190, 192, 194, 196 provided connections from splitter tree 152 to the output lines 180. Each switching block connects a signal pathway from inputs a, b, c, d to a respective output line 1, 2, 3, 4, 5, 6, 7, 8 such that a signal selected from the input ports can be selectively directed to an output line. In FIG. 3, coupling blocks are shown schematically as boxes, with specific embodiments discussed below.

Figure 4:
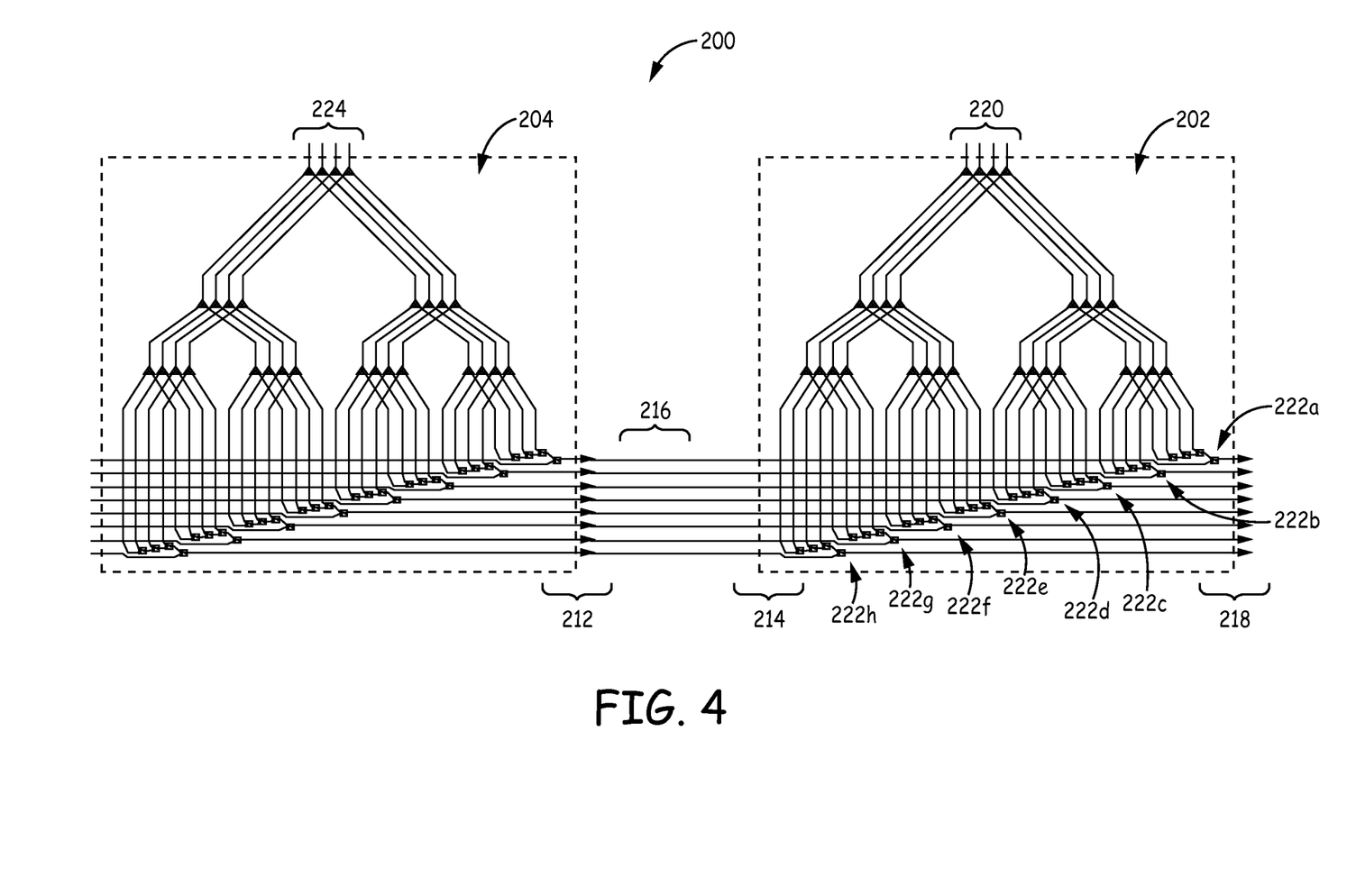
FIG. 4 is a schematic view of two coupled expandable 4×8 MCS switches configured to function as an 8×8 MCS.

Expandable optical switches have been developed to reduce optical loss associated with the expansion function through the use of low loss bypass optical channels. These expandable switches are described in more detail in the '914 patent cited above. In terms of expandable MCS switches, inputs can be coupled to bypass switches and corresponding bypass channels connected to expansion out ports that can correspondingly be connected to input ports of another MCS. Such switches with input bypass switches can provide for expansion of output connections, for example, with two N×M MCS switches functioning as an N×M', M'≤2M, MCS. Additionally or alternatively, an expandable MCS switch can have M bypass switches on each output channel connected to M expansion in ports. Such switches with output bypass switches can provide for expansion of input connections, for example, with two N×M MCS switches functioning as an N'×M, N'≤2N, MCS. Both expansions can be continued to provide for higher multiples of input and or output connections and MCS can comprise expansion ports on both the inputs and outputs for expansion capabilities in both dimensions. An embodiment of two 4×8 MCS switches with input expansion capability is shown in FIG. 4. In general, N can be 1 or more, in some embodiments at least about 4 and in further embodiments at least about 6 or more. M can be 2 or more, in some embodiments at least 4 and in additional embodiments at least 8 or more. A person of ordinary skill in the art will recognize that additional ranges of values of N and M are contemplated and are within the present disclosure.

FIG. 4 depicts assembly 200 of terminal expandable switch module 202 and initial expandable switch module 204, each expandable switch module being essentially of the embodiment described as FIG. 3, with output bypass switches and corresponding bypass channels. The outputs 212 of initial module 204 are optically coupled to the corresponding expansion-in ports 214 of terminal module 202 by means of light paths 216. Expandable switch modules 202 and 204 may be for instance individual switching cores on a common planar substrate in a photonic integrated circuit (PIC) and the interconnecting light paths 216 could be optical waveguides on the same substrate. In another example, expandable switch modules 202 and 204 may be for instance individually packaged switch modules based on separate PICs and interconnecting light paths 216 could be single-mode optical fibers either as a set of individual strands or as a fiber ribbon. Each output in output set 218 can be configured to selectively connect to one of the inputs 220 of terminal module 202 by setting the associated bypass switch in 222a-h to connect to one of the local inputs. Alternatively, each output in output set 218 can be configured to selectively connect to one of the inputs 224 of initial module 204 by setting the associated bypass switch in 222a-h to connect to the associated expansion-in port, then further setting the appropriate switch elements in switch module 204 to connect the selected input from inputs 224 to the output in outputs 212 that is connected to the corresponding expansion-in port in expansion-in ports 214. Thereby, a 4×8 expandable MCS 202 can be upgraded by attaching a second 4×8 MCS 204 to the expansion-in ports 214 forming an assembly 200 of two 4×8 switch modules that provides the same functionality as a dedicated 8×8 MCS, with the bypass pathways reducing any associated extra loss.

Figure 5:
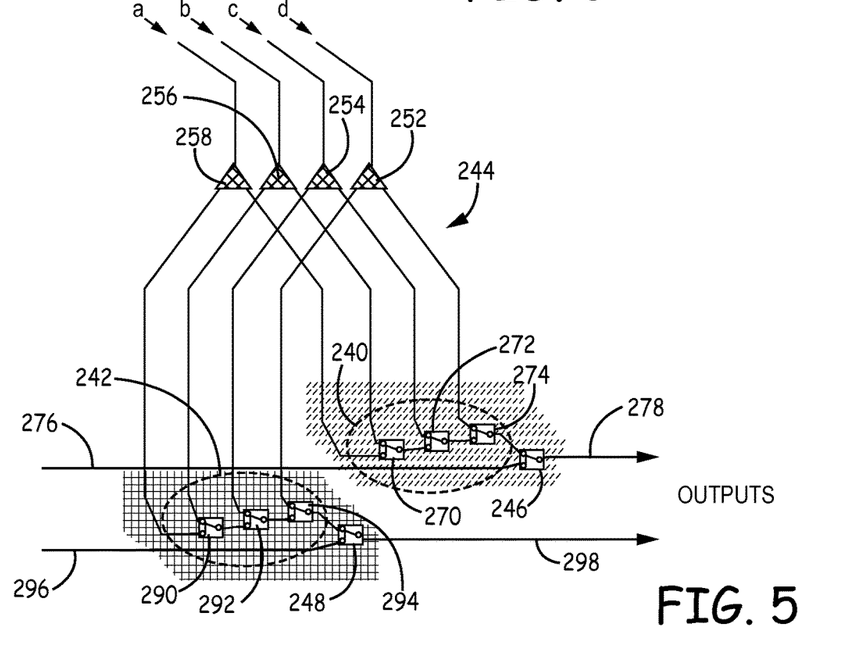
FIG. 5 is an expanded view of a set of 1×2 optical switches configured to interface the MCS switch with expansion in lines and optical output lines.

FIG. 5 is an enlarged view of an embodiment of a switching block of FIG. 3 with output switches of FIG. 4 to provide for expansion. Switching blocks 240, 242 joining a portion of splitting tree 244 with bypass switches 246, 248, respectively. Arrows a, b, c, d, depict inputs passed from level three of the splitting tree. In this embodiment, each switching block receives one input from each of the four potentially available inputs a-d through switches 252, 254, 256, 258. Each bypass switch 246, 248 provides a choice to output one of a-d or a signal in the bypass line. The switching blocks 240, 242 are arranged in a serial configuration to sequentially select between a signal from an added optical line. Specifically for block 240, for instance, optical switch 270 provides for input a or b to be chosen, with the chosen signal a/b being passed to switch 272 that provides for switching between a/b or c, with the chosen signal a/b/c being passed to switch 274 that provides for switching between a/b/c and d. Switching block 240 then passes one of the signals a-d to bypass switch 246, which provides for a choice between a/b/c/d and bypass path 276. The signal selected by bypass switch 246 then passes to output line 278. Similarly for block 242, optical switch 290 provides for input a or b to be chosen, with the chosen signal a/b being passed to switch 292 that provides for switching between a/b or c, with the chosen signal a/b/c being passed to switch 294 that provides for switching between a/b/c and d. Switching block 242 then passes one of the signals a-d to bypass switch 248, which provides for a choice between a/b/c/d and bypass path 296. The signal selected by bypass switch 248 then passes to output line 298.

Figures 6, 7:
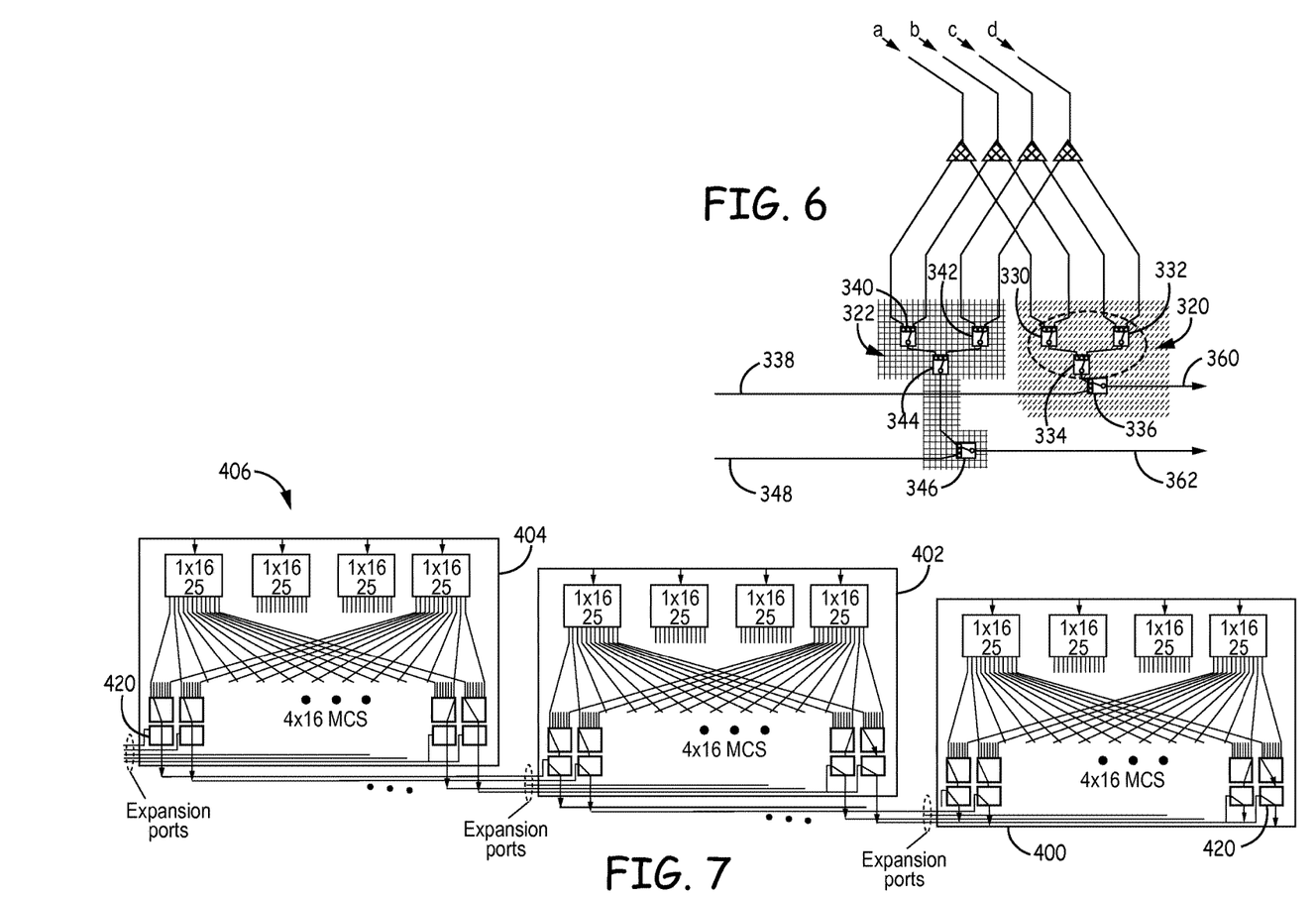
FIG. 6 is an expanded view of an alternative embodiment of 1×2 optical switches configured to interface the MCS switch with expansion in lines and optical output lines.
FIG. 7 is an illustration of cascading three 4×16 expandable MCSs to form a 12×16 MCS.

FIG. 6 depicts an alternative subportion for an expandable switch with an alternative switching block design. Switching blocks 320, 322 are arranged in a tree configuration and are a functionally-equivalent alternative to switching blocks 240 and 242 of FIG. 5. In block 320, switch 330 is selectable between a and b inputs to provide output a/b and switch 332 is selectable between c and d inputs to provide output c/d. Switch 334 is selectable between a/b and c/d to provide an output a/b/c/d to bypass switch 336, which is, in turn selectable between a/b/c/d or bypass signal from bypass channel 338. Switches 340, 342, 344, 346 are similarly configured to provide selectivity between any of a-d and bypass channel 348. Bypass switches 336, 346 respectively connect to outputs 360, 362.

The basic architecture of a 4×16 degree-expandable MCS in the drop direction is shown in FIG. 7, in which three 4×16 MCS 400, 402, 404 are configured as an effective 12×16 MCS 406 based on expansion capabilities. It is based on a basic 4×16 MCS except that at the bottom layer there is an array of 1×2 optical switches 420 (in which only two are labeled in the figure to avoid clutter) to make the switch expandable. Each 1×2 optical switch has an output port that corresponds to one of the 16 output ports, and has two input ports with one connecting to the original output port and the other connecting to one of the expansion ports. With respect to the 4×16 MCS 400 which gets deployed first (i.e., the right-most one in FIG. 7), if no degree expansion beyond 4 is needed, the 1×2 optical switches toggles to the right; while if 8-degree traffic needs to be supported, one or more of its 1×2 optical switches toggles to the left, and the second 4×16 MCS is added through the expansion ports (i.e., the middle one in FIG. 1). The two cascaded 4×16 MCSs then become an 8×16 MCS. Similarly, 12×16 (as shown in FIG. 7) and 16×16 MCS can be formed by cascading three and four 4×16 MCSs, respectively.

The main advantage of this architecture is that one can cover 4, 8, 12, 16, and even up to 20 degrees or more by using the same 4×16 MCS as the basic module. If the MCS switches are also configured with another row of switches on the inputs with corresponding expansion out bypass channels, the MCS can similarly be expanded with respect to ultimate numbers of output degrees. A potential disadvantage is that the extra insertion loss introduced by the cascaded 1×2 optical switches could prohibit the expansion to a large number of degrees. However, it is shown below 4 that the tolerance of the insertion loss due to the cascaded 1×2 optical switches can actually be relatively high in a metro optical network.

In an optical network, a signal to be communicated generally is converted at some location from an electrical signal to an optical signal. The optical signal is generally multiplexed for longer range transmission. Various switching, amplifications and signal conversions may or may not take place in directing the optical signal. The optical signal is then received at a node, such as a metro node where the specific signal is separated from other commonly transported signals and switched, for example, to be sent to the specific recipient. In certain state of the art optical communication systems, optical signals are sent coherently such that the phase and amplitude can distinguish the optical signal, and correspondingly, optical receivers can be integrated (e.g., intradyne) coherent receivers that provide for the tracking of the phase between the optical signal and the local oscillator, for example, using the intradyne principle. Integrated coherent receivers are available commercially from Neophotonics Corporation. The intradyne principle is based on the tracking of the phase with digital processing after the signal is converted with an analog to digital processing.

The optical signal-to-noise ratio (OSNR) is a measure of the robustness of the signal and quantifies the risk of signal loss to the noise during the signal processing. Amplification can boost the OSNR at the expense of cost and power consumption. An OSNR of a least about 13.5 dB is desired for forward error correction (FEC) codes, which form the basis for error-free signal recovery from a transmission having finite but infrequent bit errors. Using a hard-decision Continuous Interleaving-Bose-Chaudhuri-Hocquenghem (CI-BCH) code, a raw bit error rate (BER) of $3.8 \times 10^{-3}$ or less can be tolerated, and in alternative soft-decision FEC a raw BER of $1 \times 10^{-2}$ or less can be tolerated at the stated OSNR. See de Oliveira et al., J. Lightwave Technology, 31 (16), 2799-2808 (2013) and Xia et al., Optical Fiber Communication Conference (2012), PDP5D.6, both of which are incorporated herein by reference. In long range optical communication systems, an OSNR of 14-15 dB can be expected. A tolerable BER can be selected for system design.

In a metro optical network, however, a higher OSNR can be achieved due to its shorter inter-spans between EDFAs, and shorter total transmission distance. In the extreme case when there is no optical amplifier in the system, the beat noise between a local-oscillator (LO) and amplifier spontaneous emission (ASE) noise is completely removed, and this avoids the impairment of an ICR's effective sensitivity that occurs when presented with such beat noise. It has been shown that by using an ICR with a medium quality (average responsivity=0.042 A/W, common-mode-rejection-ratio (CMRR, DC-20 GHz)<−28 dBe) and a 15 dBm LO with relative intensity noise (RIN)=−145 dB/Hz, a receiver sensitivity of −29.1 dBm at a BER of 8.55e-5 was obtained. See Younce et al., Optical Fiber Communications Conference (2013), OTh4B.5, incorporated herein by reference. We carried out a similar experiment by randomly picked three ICRs (with signal responsivities>0.074 A/W, and CMRR's<−24 dBe), and obtained all receiver sensitivities to be <−35 dBm at a BER=1e-3, with an LO power of 14.5 dBm and RIN<−150 dB/Hz.

Figure 8:
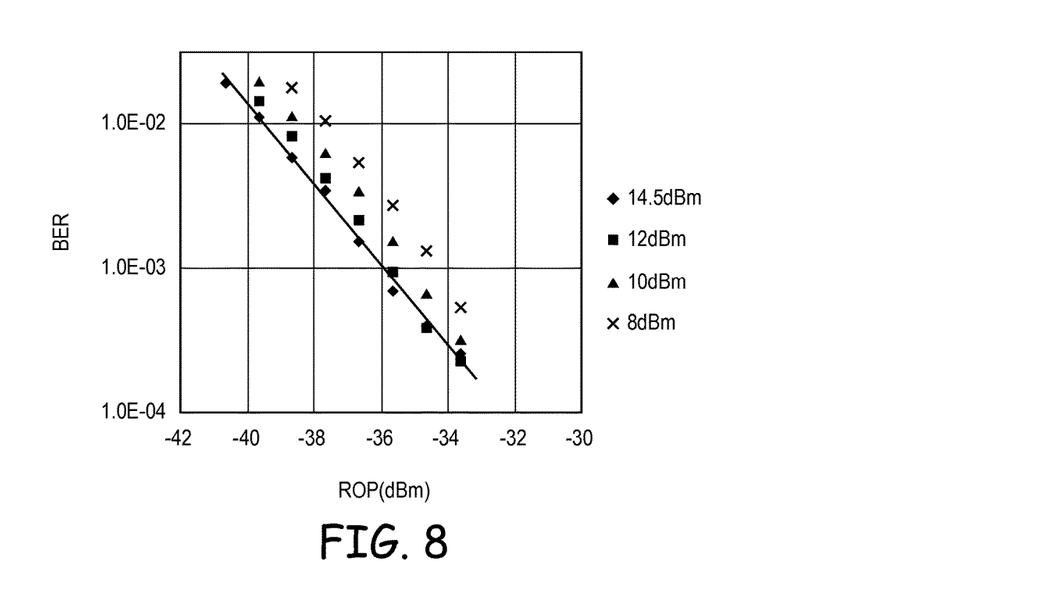
FIG. 8 is a plot of bit error rate (BER) as a function of receiver optical power for a set of intradyne coherent optical receivers with various specified local oscillator strengths for an optical system with an optical signal-to-noise ratio of 20 dB.
Figure 9:
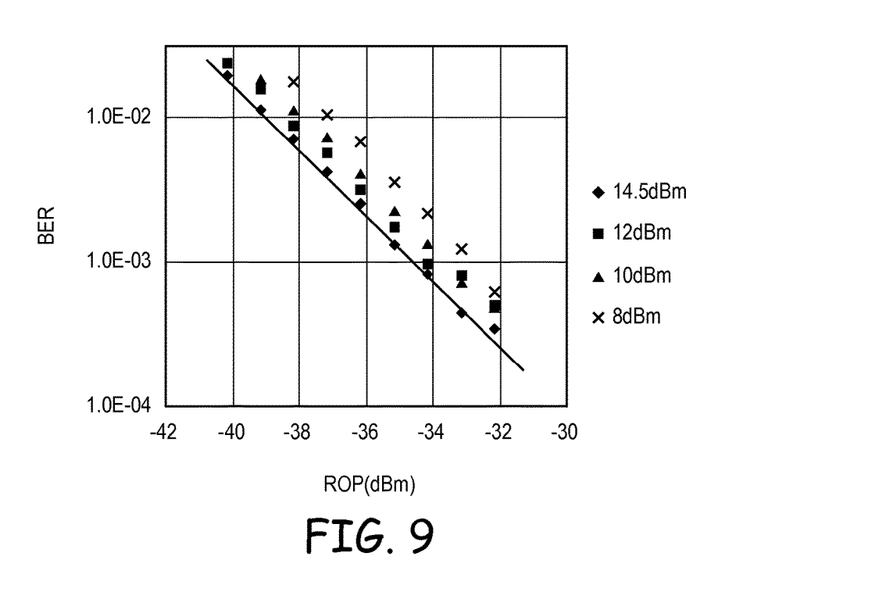
FIG. 9 is a plot of bit error rate (BER) as a function of receiver optical power for a set of intradyne coherent optical receivers with various specified local oscillator strengths for an optical system with an optical signal-to-noise ratio of 17 dB.
Figure 10:
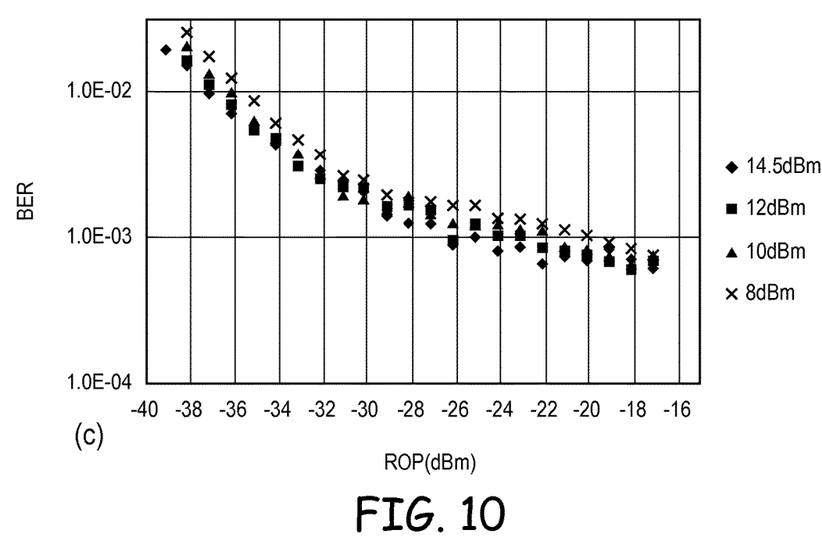
FIG. 10 is a plot of bit error rate (BER) as a function of receiver optical power for a set of intradyne coherent optical receivers with various specified local oscillator strengths for an optical system with an optical signal-to-noise ratio of 14 dB.

Referring to FIGS. 8-10, measurements were obtained with plots showing measured BER versus receiver optical power (ROP) for an OSNR of 20 dB (FIG. 8), 17 dB (FIG. 9), and 14 dB (FIG. 10). LO power level ranges from 8 to 14.5 dBm. An intradyne coherent receiver (ICR) was used with the following parameters: responsivity=0.082 A/W, LO CMRR=−44 dBe, signal CMRR=−50 dBe. Similar results (within 1 dB) were obtained for other ICRs with responsivities=0.07 A/W and CMRR between −23 and −30 dBe. When we added EDFA to the link and control the received optical signal-to-noise ratio (OSNR) to be about 17 dB or about 20 dB (corresponding to a reasonable OSNR range of a metro optical network), we obtained the BER versus ROP shown in FIGS. 8 and 9, respectively. We can see that at an OSNR of 20 dB, a receiver sensitivity of −36 dBm at a BER=1e-3 and an LO power of 14.5 dBm was measured (FIG. 8). When OSNR is lowered to 17 dB, the effective receiver sensitivity is degraded slightly to −34.2 dBm (FIG. 9). With a further degraded signal with the received OSNR to 14 dB, as is typical in a long-haul system, it can be seen in FIG. 10 that there exists an error floor near BER=1e-3 for ROP between −26 and −18 dBm.

From the above measurement results, it can be seen that once a received OSNR is over 17 dB, which is a reasonable number for a metro optical network, maintaining the receiver sensitivity at a BER of >1e-3 can be greatly improved, due to the much lower LO-ASE beat noise. In fact, if a metro network-oriented DP-16QAM signal (WDM format) needs to be added/dropped, the network received OSNR has to be maintained at >21 dB. See Carena et al., J. Lightwave Technology, 30 (10), 1524-1539 (2012) and Younce et al., Optical Fiber Communications Conference and Exhibition (2013), OTh4B.5, both of which incorporated herein by reference. Consequently, given a much improved receiver sensitivity, it is realistic to design a system eliminating drop-side EDFAs in a CDC ROADM, which could include either degree-expandable 4×16 or conventional 8×16 CDC ROADMs as well as other dimensions of ROADMs. For systems of particular interest, the appropriate BER values generally are no more than about $2\times10^{-2}$ and in some embodiments no more than about $1\times10^{-2}$. For use with ROADM having unamplified output/drop ports, the OSNR generally is no more than about 16.5 dB and in further embodiments no more than about 17 dB. The receiver optical power can be no more than about −36 dBm, and in further embodiments no more than about −37 dBm. The receiver sensitivity indicates that the receiver can be suitable for processing a signal of at least a certain power level. Thus, a receiver can have a minimum received optical power for signal processing of no more than about −36 dBm, in further embodiments no more than about −37 dBm and in some embodiments no more than about −39 dBm. A person of ordinary skill in the art will recognize that additional ranges of receiver parameters within the explicit ranges above are contemplated and are within the present disclosure.

The understanding of these relationships allows for the design of an optical switching system that can be based on a non-amplified ROADM while achieving appropriate signal processing with a selected optical receiver. Specifically, with these relationship, for a given OSNR associated with the input signals and a given unamplified ROADM, a suitable optical receiver can be selected. The BER is selected to achieve appropriate signal processing based on a signal processing approach. A plot of the relationship of the BER as a function of the ROP for a particular LO power allows for a selection of a ROP of the receiver that will provide the appropriate BER. In general, a lower ROP in units of dBm corresponds with a less expensive optical receiver. Then, a more cost effective system can be designed with an appropriate optical receiver not unnecessarily expensive, but fully functional. This can give a system designer confidence to proceed with an unamplified ROADM (although input signal can be amplified with a lower number of amplifiers) at a considerable savings in cost and power consumption.

In summary, system requirements can be evaluated in terms of OSNR of input signal and BER desired for signal processing. Optical receiver properties (ROP, LO power, RIN, average responsivity and CMRR) can be then selected consistent with obtaining the BER within an appropriate range for accurate signal processing. Thus, the understanding of these relationships allows for the selection of an appropriate receiver to operate with an un-amplified ROADM while generating a sufficiently low bit-error rate.

Measurements with Test System

Figure 11:
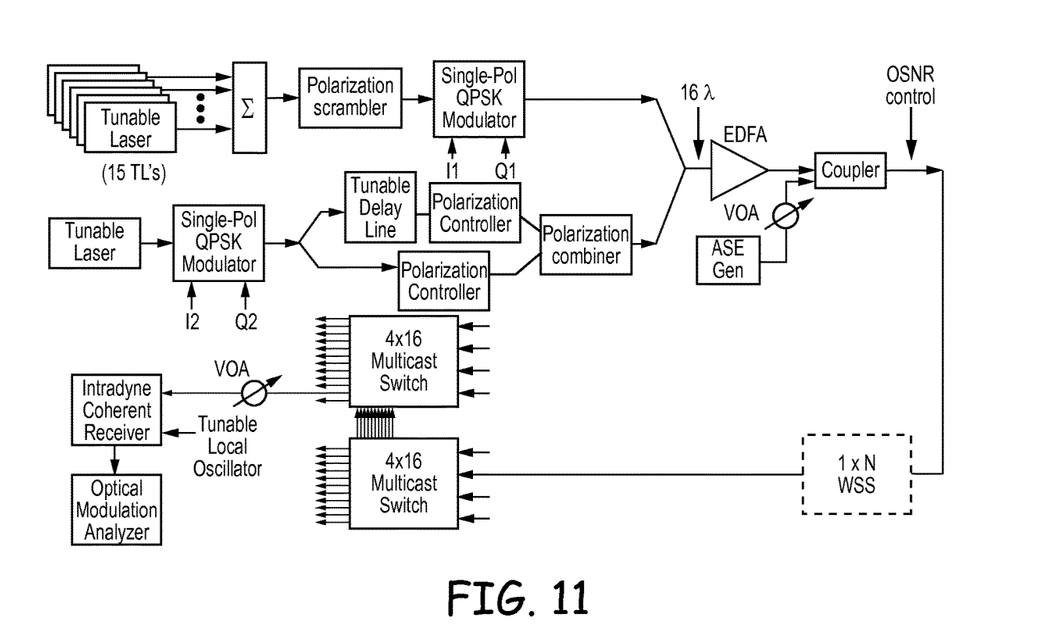
FIG. 11 is a schematic layout of an optical test setup to evaluate the bit error rates for MCS set ups without amplified drop channels on the MCS.

An experimental test-bed which includes two degree-expandable 4×16 MCSs, shown in FIG. 11, was set up to investigate the feasibility of removing drop-side EDFAs in a CDC ROADM. The wavelength under test was set at 1547.715 nm, and was modulated by an instrument-level 28 Gbaud single-polarization (SP) QPSK transmitter. The output of the SP-QPSK transmitter was split into two ways, polarization controlled, delayed, and recombined to form a 28 GBaud DP-QPSK signal. For 16 drop ports in a CDC ROADM, we need to investigate the worst case when all 16 wavelengths come from the same direction, which implies the case when there are 16 co-incident wavelengths on an ICR. To study this condition, we generated another 15 wavelengths by combining 15 tunable lasers, polarization scrambled them and sent to a second 28 GBaud SP-QPSK modulator. The wavelength under test and the 15 interfering wavelengths are then combined and amplified by an EDFA, and combined with an ASE source to emulate the OSNR that would be generated in a metro optical network. In a real network, the 16 wavelengths are supposed to pass through a 1×N route-and-select wavelength selective switch (WSS), see Younce et al. referenced above, before going through one or more MCSs, but we skipped this WSS stage which should not affect the results. The optical power level for each of the 16 wavelengths before entering the first stage MCS is controlled at −10 dBm/λ, which is based on the consideration that a typical output power out of an express direction EDFA is 0 dBm/λ, an insertion loss of ≤7.5 dB due to a 1×20 WSS, and other insertion loss due to patch panels/cords.

The 16 wavelengths, each at −10 dBm/λ, were then sent through two cascaded stages of 4×16 MCSs, which performs the same drop function as an 8×16 MCS. The insertion loss of the two cascaded MCSs is 18.3 dB, which shows only 2.3 dB extra loss when compared to a single-stage 4×16 MCS. The measured BER versus ROP results for λ=1547.715 nm under 16 co-incident modulated wavelengths are essentially the same as when there was only one wavelength. This is because at an ROP of <−30 dBm, it is the thermal noise which dominates, whereas the noise terms due to direct-detection terms from the other 15 wavelengths are negligible. In addition, as has been previously demonstrated, even for an ICR with a CMRR of only <−20 dBe and an ROP of −16 dBm/λ, the OSNR penalty due to 16 co-incident wavelengths at a BER=1e-3 is less than 0.2 dB. See Way, et al., Optical Fiber Communications Conference (2012) NTh4J, incorporated herein by reference. Note that the BER was measured by the DSP in an optical modulation analyzer.

Figure 12:
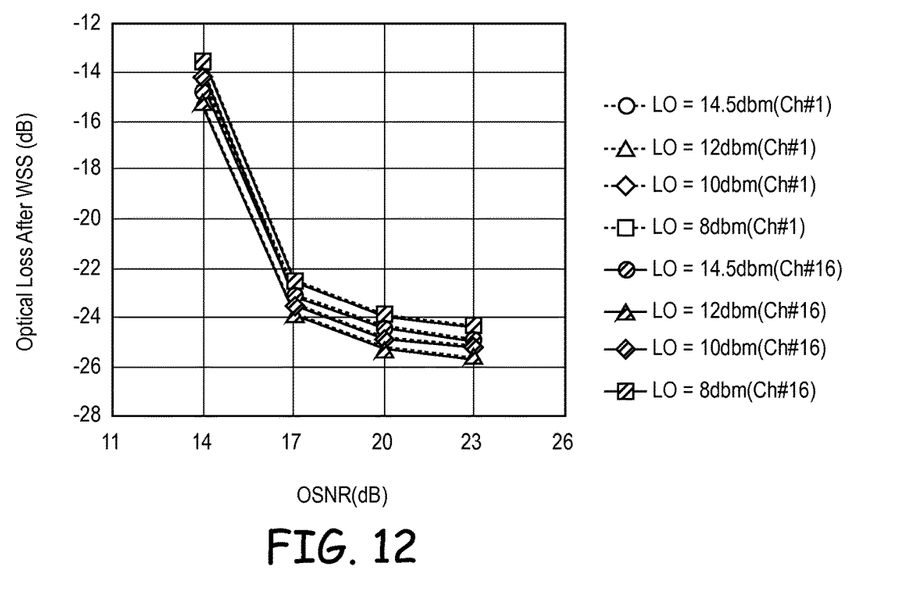
FIG. 12 is a plot of tolerable optical loss for an optical node comprising MCS switches where the loss is evaluated between the input of the MCS and an optical receiver evaluated as a function of the optical signal-to-noise for a set of local oscillator powers in dBm.

We measured the total allowable optical loss budget between the output of a 1×20 WSS and the input to an ICR under BER=1e-3 and different OSNR conditions, and by using an ICR with the following parameters: responsivity=0.078 A/W, all CMRR's<−27 dBe, and the results are shown in FIG. 12. It can be seen that the optical loss budget can range from 22 to 26 dB, depending on the LO power levels and OSNRs. When OSNR=17 dB and LO power=10 dBm, a loss budget of 23 dB can be obtained to allow four 4×16 MCS to be cascaded (16+2.3 dB×3=22.9 dB), so as to form a 16×16 MCS without drop-side EDFAs. Note that the same principle can be applied to a conventional N×M MCS (e.g., N=8, M=16) to avoid using drop-side EDFAs.

In conclusion, we have built a CDC ROADM test-bed to experimentally prove that when the received OSNR is higher than 17 dB as in a metro optical network, there would be sufficient optical power budget between the output of a 1×N WSS and the input of an ICR to avoid using drop-side EDFAs. The CDC ROADM can be composed of cascaded degree-expandable 4×16 MCSs or conventional N×M MCSs (e.g., N=8, M=16). In the case of degree-expandable 4×16 MCSs, we showed that at an OSNR of 17 dB and an LO power of 10 dBm, 16×16 MCS can be formed by four cascaded 4×16 MCSs without using drop-side EDFAs.

The embodiments herein are intended to be illustrative and not limiting. In addition, although the present invention has been described with reference to particular embodiments, those skilled in the art will recognize that changes can be made in form and detail without departing from the spirit and scope of the invention. All referenced patents above are hereby incorporated by reference and such incorporation by reference of documents above is limited such that no subject matter is incorporated that is contrary to the explicit disclosure herein.

What is claimed is:

1. A method of routing optical signals for a lower optical noise network, the method comprising:
routing a combined input optical signal with no more than N signals for routing through an unamplified reconfigurable optical add-drop multiplexer (ROADM), wherein the input optical signal has an optical signal-to-noise value of at least about 16.5 dB, to 1 to M optical receivers configured on separate optical pathways and having a bit error rate of no more than about $1 \times 10^{-2}$, wherein the ROADM comprises N 1×N WSS and a N×M multicast switch, which can be a single unit or a set of connected expandable units.

2. The method of claim 1 wherein ROADM is physically located at a node of a metro area optical network.

3. The method of claim 1 wherein the N input signals are amplified prior to input of the optical signals into the WSS.

4. The method of claim 1 wherein each input signal is a multiplexed optical signal.

5. The method of claim 1 wherein the MCS comprises a tree structure of 1×2 switches to route any one of the N inputs to any one of the M output/drop ports.

6. The method of claim 1 wherein receiver has a minimum received optical power for signal processing of no more than about −36 dBm.

7. A method of selecting an optical coherent receiver for receiving an optical signal from an unamplified drop port of a ROADM switch, the method comprising:
identifying an optical coherent receiver that would provide a bit error rate (BER) less than a cut off value based on an algorithm to extract data from the optical signal with appropriate forward error correction technique when the optical coherent receiver is optically connected to a light channel connected to the unamplified drop port of the ROADM.

8. The method of claim 7 wherein the BER cut off value is $1 \times 10^{-2}$.

9. The method of claim 7 wherein the optical signal to noise ratio input into the receiver is identified to be at least about 16.5 dB.

10. The method of claim 7 wherein receiver has a minimum received optical power for signal processing of no more than about −36 dBm.

11. The method of claim 7 wherein the receiver is designed for signal processing with CI-BCH forward error correction.

12. The method of claim 7 wherein the receiver has a minimum received optical power for signal processing of no more than about −37 dBm.

13. The method of claim 7 wherein the receiver has a minimum received optical power for signal processing of no more than about −39 dBm.

14. The method of claim 7 wherein the BER cut off value is no more than $1 \times 10^{-2}$, wherein the optical signal to noise ratio input into the receiver is identified to be at least about 16.5 dB, and wherein receiver has a minimum received optical power for signal processing of no more than about −36 dBm.

* * * * *